United States Patent
Shyu et al.

(10) Patent No.: US 7,430,052 B2
(45) Date of Patent: Sep. 30, 2008

(54) METHOD FOR CORRELATING THE LINE WIDTH ROUGHNESS OF GRATINGS AND METHOD FOR MEASUREMENT

(75) Inventors: Deh Ming Shyu, Miaoli County (TW); Yi Sha Ku, Hsinchu (TW)

(73) Assignee: Industrial Technology Research Institute, Hsinchu County (TW)

( * ) Notice: Subject to any disclaimer, the term of this patent is extended or adjusted under 35 U.S.C. 154(b) by 20 days.

(21) Appl. No.: 11/696,430

(22) Filed: Apr. 4, 2007

(65) Prior Publication Data

US 2008/0144050 A1 Jun. 19, 2008

(30) Foreign Application Priority Data

Dec. 13, 2006 (TW) .............................. 95146611 A (51) Int. Cl.
- G01B 11/02 (2006.01)
- G01N 23/00 (2006.01)
- G06K 9/46 (2006.01)

(52) U.S. Cl. ........................ 356/636; 356/600; 356/605; 382/108; 702/155

(58) Field of Classification Search ......... 356/601–625, 356/630–636, 400–401; 250/559.3, 559.22, 250/559.27, 492.1–492.3; 382/108, 141; 702/155, 166, 170, 19, 57

See application file for complete search history.

(56) References Cited

U.S. PATENT DOCUMENTS

| | | | | |
|---|---|---|---|---|
| 5,625,619 A * | 4/1997 | Toda et al. | ............. | 369/109.02 |
| 6,891,626 B2 * | 5/2005 | Niu et al. | ..................... | 356/625 |
| 6,909,791 B2 * | 6/2005 | Nikitin et al. | ................ | 382/108 |
| 7,046,375 B2 * | 5/2006 | Bischoff et al. | ............. | 356/600 |
| 7,049,589 B2 * | 5/2006 | Yamaguchi et al. | ......... | 250/310 |
| 7,230,723 B2 * | 6/2007 | Yamaguchi et al. | ......... | 356/605 |
| 7,300,730 B1 * | 11/2007 | Willis et al. | ................... | 430/30 |
| 2004/0201836 A1 | 10/2004 | Chang et al. | | |

FOREIGN PATENT DOCUMENTS

JP 06174427 A * 6/1994

* cited by examiner

Primary Examiner—Sang Nguyen
(74) Attorney, Agent, or Firm—WPAT, Inc; Anthony King (57) ABSTRACT

A method for correlating line width roughness of gratings first performs a step (a) generating a characteristic curve of a predetermined grating having a known line width, and a step (b) performing a comparing process to select a matching spectrum from a plurality of simulated diffraction spectrum of known line width, and setting the known line width of the matching spectrum as the virtual line width of the predetermined grating. Subsequently, the method performs a step (c) changing a measuring angle and repeating the steps (a) and (b) to generate a virtual line width curve, and calculating the deviation of the virtual line width curve. The method then performs a step (d) changing the line width roughness of the predetermined grating and repeating the steps (a), (b) and (c), and a step (e) correlating the line width roughness and the deviation of the virtual line width curve to generate a correlating curve.

17 Claims, 12 Drawing Sheets

METHOD FOR CORRELATING THE LINE WIDTH ROUGHNESS OF GRATINGS AND METHOD FOR MEASUREMENT

BACKGROUND OF THE INVENTION (A) Field of the Invention

The present invention relates to a method for correlating the line width roughness (LWR) of gratings and a method for measuring the same.

(B) Description of the Related Art

With the rapid progress of semiconductor fabrication technology, the critical dimension (CD) has been reduced to below 100 nanometers (sub-100 nm), and lithography processes have become more and more challenging. Particularly, the importance of the lithography process in controlling LWR has become increasingly significant. Extensive research shows that measuring problems caused by LWR deeply influence the allowable error of CD of the fabrication process as the line width has become smaller, resulting in deterioration of electrical properties of electronic devices.

As for the measuring requirement of LWR, the International Technology Roadmap for Semiconductor (ITRS) points out the development trend of the size of the electronic device in the future and the corresponding measuring requirements for LWR in the year of 2005. Due to the advantages of high repeatability and reproducibility, the angular scatterometer is considered to have the potential to become the primary tool for measuring the structural parameters of semiconductor devices in the near future.

The atomic force microscope (AFM) is a measuring tool first applied to LWR. The AFM is based on the principle of utilizing the weak force between the tip atom and the sample-surface atom as feedback to keep the tip scanning at a fixed height above the sample so as to measure the ups and downs on the surface of the sample. The lateral resolution of the AFM is approximately 2 to 10 nm, and the vertical resolution is approximately 0.1 nm. However, a disadvantage of the AFM is that the scanning speed is quite low, and thus it is not suitable for in-line metrology.

Another tool for the LWR is a scanning electron microscope (SEM), which has the advantage of being able to clearly show the surface roughness (for example, the uneven surface). The SEM uses the interaction of the secondary electrons between the electronic beam and the grating under test to measure the surface roughness, with a lateral resolution of approximately 5 nm and vertical resolution of approximately 10 nm. However, if the deep ultraviolet photoresist used in advanced semiconductor fabrication processes is exposed to the electronic beams of the SEM, it can easily cause a line width shrinkage effect, thereby influencing the CD measurement.

The conventional AFM applied to the grating LWR measurement has the disadvantage of very low scanning speed, while the SEM causes shrinkage of the photoresist pattern to result in the line width shrinkage effect thereby influencing the CD measurement.

SUMMARY OF THE INVENTION

The present invention provides a method for correlating the line width roughness of gratings using an angular scatterometer and a method for measuring the same.

A method for correlating the line width roughness of gratings according to this aspect of the present invention comprises the steps of (a) generating a characteristic curve of a predetermined grating having a predetermined line width roughness, (b) performing a comparing process to select a matching simulated diffraction spectrum matched with the characteristic curve from a plurality of simulated diffraction spectrums with known line width, and setting a virtual line width of the characteristic curve by using the line width of the matching simulated diffraction spectrum, (c) changing a measuring angle and repeating steps (a) and (b) to generate a virtual line width curve, and calculating a deviation of the virtual line width curve, (d) changing the line width roughness of the predetermined grating and repeating steps (a), (b) and (c) to obtain a predetermined number of deviations of the virtual line width curves, and (e) correlating the line width roughness with the deviation of the virtual line width curve.

Another aspect of the present invention provides a method for measuring the line width roughness of gratings comprising the steps of (a) acquiring a characteristic curve of gratings under test, (b) performing a comparing process to select a matching simulated diffraction spectrum matched with the characteristic curve from a plurality of simulated diffraction spectrums with known line width, and setting a virtual line width of the characteristic value by using the line width of the matching simulated diffraction spectrum, (c) changing a measuring angle and repeating steps (a) and (b) to generate a virtual line width curve, and calculating a deviation of the virtual line width curve, and (d) calculating the line width roughness of the grating under test based on the deviation of the virtual line width curve.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

Figure 1A:
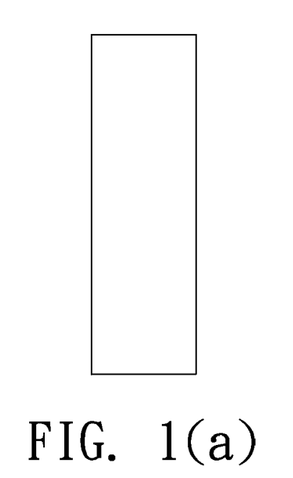
FIGS. 1 and 2 show the definition of the LWR.
Figure 1B:
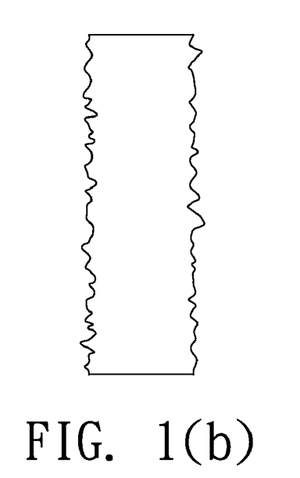
Figure 1C:
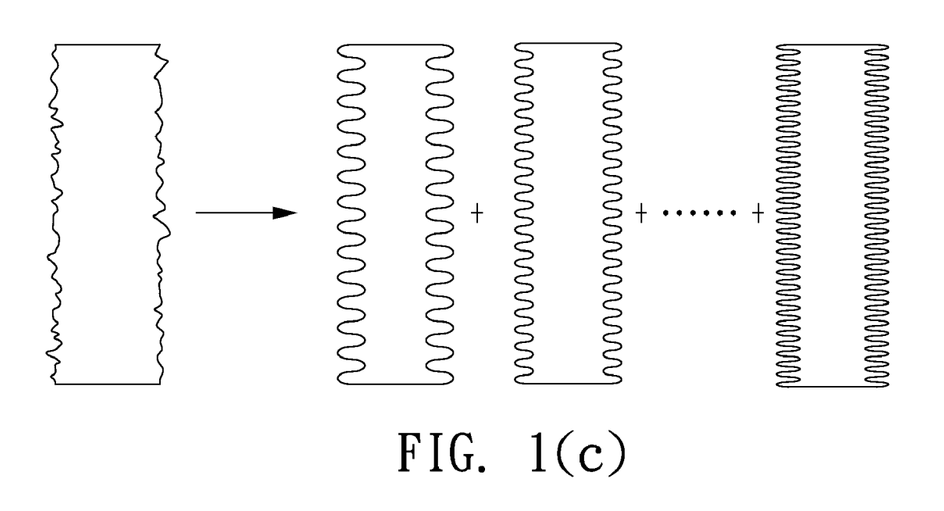
Figure 2:
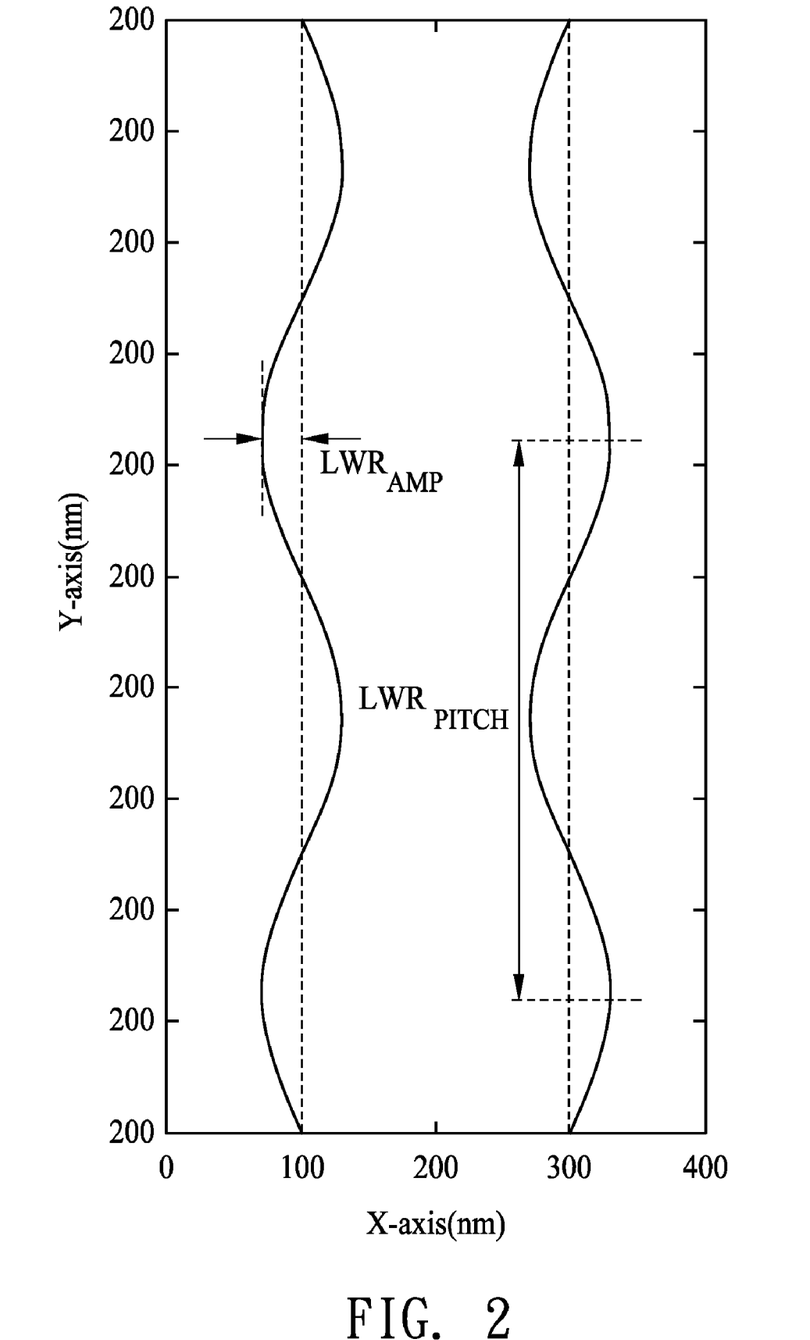

FIGS. 1 and 2 show the definition of the LWR. FIG. 1(a) is a designed linear pattern having edges with desired straight lines, while FIG. 1(b) is a linear pattern actually fabricated using the lithography process, with edges that are irregularly changed curves rather than the desired straight lines. Fourier analysis is used to resolve the linear pattern having edges with irregularly changed curves to obtain a linear combination of sinusoidal curves with different periods and amplitudes, as shown in FIG. 1(c). As shown in FIG. 2, the sinusoidal curve is defined by two parameters, namely, $LWR_{AMP}$ and $LWR_{PITCH}$, where $LWR_{AMP}$ represents the amplitude of the sinusoidal curve and $LWR_{PITCH}$ represents the period of the sinusoidal curve.

Figure 3:
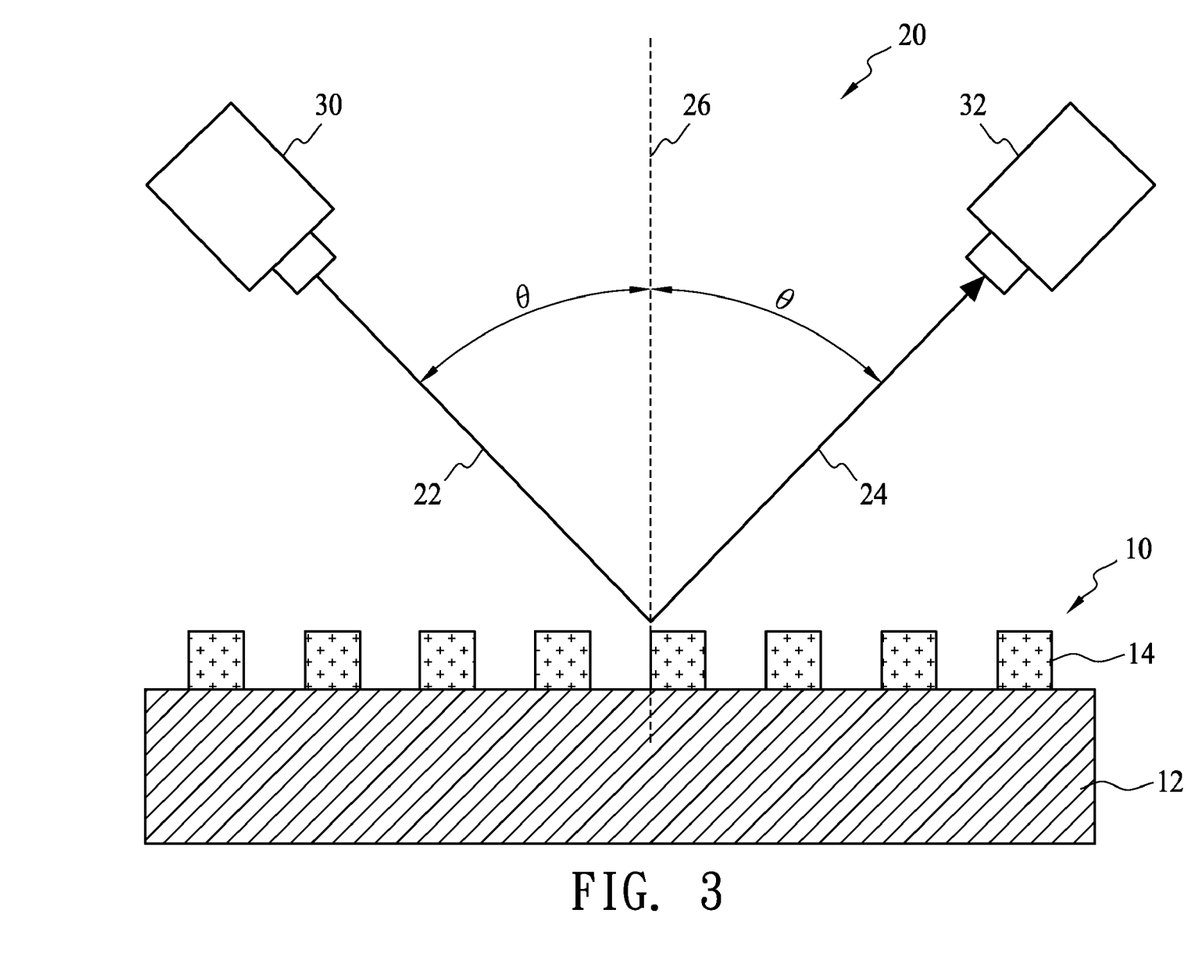
FIGS. 3 to 5 show the measurement of a grating under test by an angular scatterometer.
Figure 4:
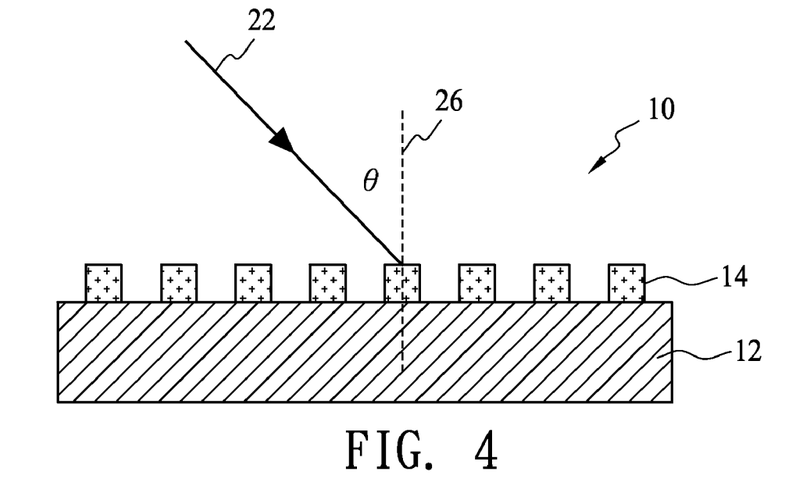
Figure 5:
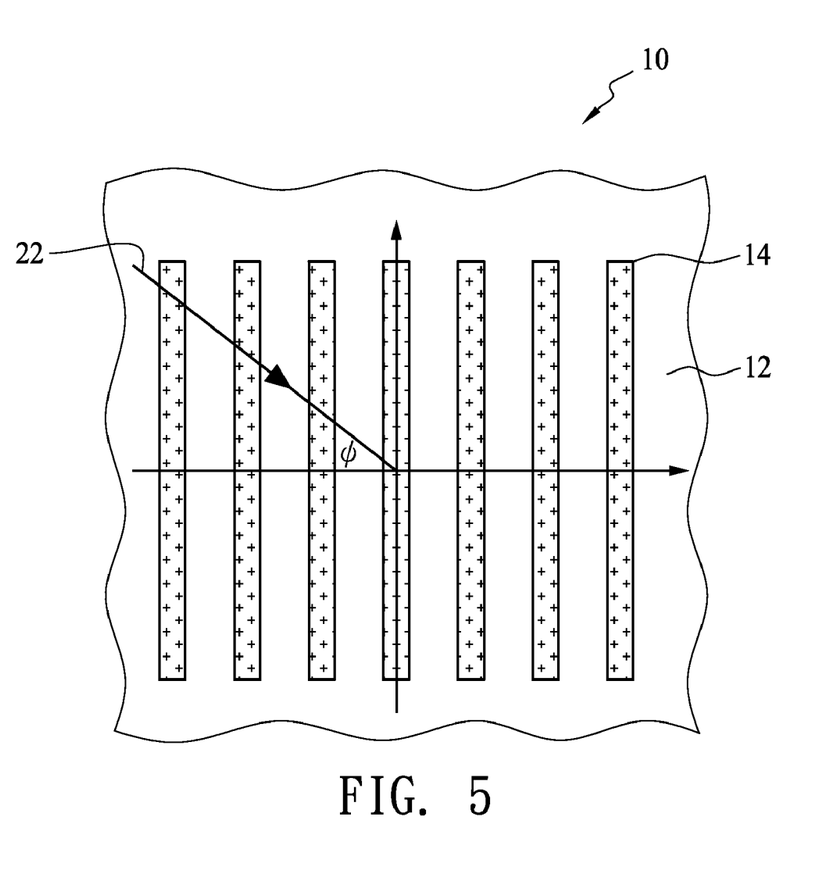

FIGS. 3 to 5 show an angular scatterometer 20 used to measure a grating 10 under test, and FIGS. 4 and 5 are a side view and a top view, respectively, of FIG. 3. The grating 10 under test includes a substrate 12 and a grating structure 14. When a laser beam 22 generated by a laser source 30 irradiates on the grating structure 14, a detector 32 is configured to detect a zero-order diffraction light 24 of the laser beam 22. As the scanning angle (θ) of the laser beam 22 changes, the receiving angle of the detector 32 also changes so that the angular scatterometer is generally called (2-θ) optical system architecture. Particularly, the scanning angle (θ) is an included angle between the laser beam 22 and the normal line 26 (as shown in FIG. 4), and the measuring angle (φ) is an included angle between the laser beam 22 and the grating structure 14 (as shown in FIG. 5).

Figure 6:
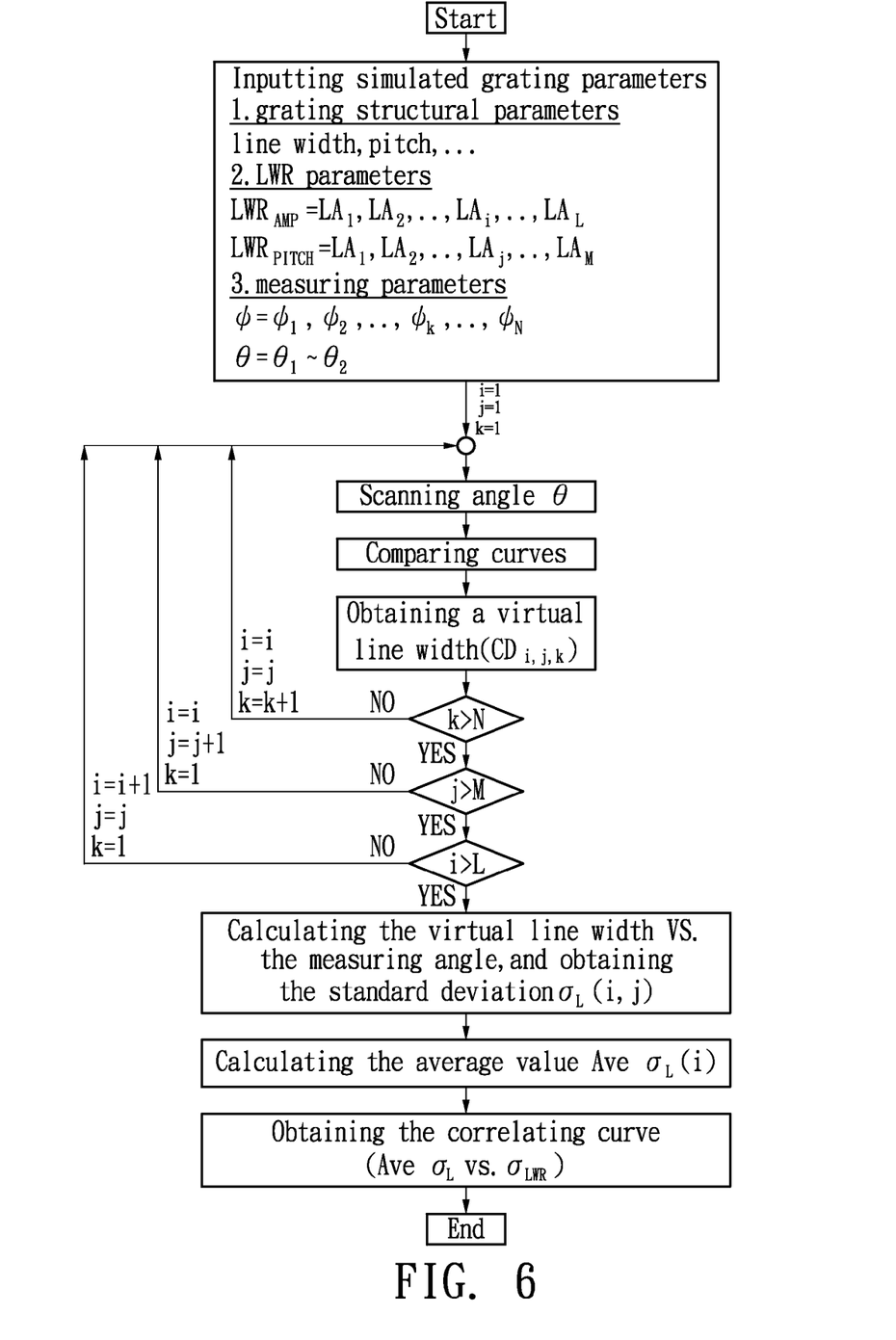
FIGS. 6 to 12 show a method for correlating the LWR standard deviation and the average curve standard deviation of the present invention.

FIGS. 6 to 12 show a method for correlating the LWR standard deviation ($\sigma_{LWR}$) and the average curve standard deviation (Ave $\sigma_L$) according to the present invention. Assuming the wavelength of the laser beam 22 of the angular scatterometer is 632.8 nm, the simulated scanning angle θ=−45°~+45°, and the measuring angle φ=0°~90°. The pitch of the grating structure 14 is 400 nm, the line width is 65 nm, the thickness is 50 nm, and the material is photoresist. As described above, the edge of the linear pattern changes irregularly, and is equivalent to a linear combination of several sinusoidal curves with predetermined values of $LWR_{PITCH}$ and $LWR_{AMP}$. The $LWR_{PITCH}$ values are mainly distributed within 100 nm, and the $LWR_{AMP}$ values are within approximately several nanometers. Therefore, the simulating range of $LWR_{PITCH}$ is set between 40 and 200 nm, and the simulating range of $LWR_{AMP}$ is set between 4 and 15 nm. According to the simulating range, a correlating curve of an LWR and the deviation of the virtual line width curve is established, and the flow is shown in FIG. 6.

Figure 7A:
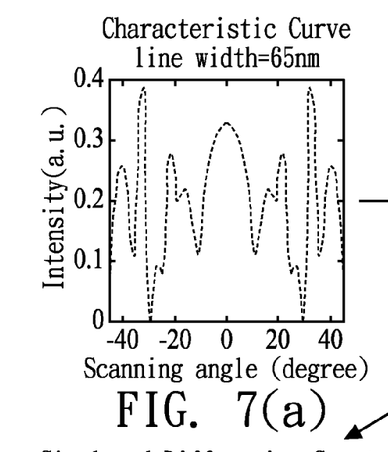

Firstly, simulated grating parameters are input, wherein the simulated grating parameters include: 1. grating structural parameters (for example, line width, pitch, material, thickness), 2. LWR parameters (for example, $LWR_{AMP}$ and $LWR_{PITCH}$), and 3. measuring parameters such as simulated scanning angle (θ) and simulated measuring angle (φ). Next, setting i=1, j=1, and k=1, a three-dimensional rigorous coupled wave theory is used to simulate the change of the diffraction intensity as the scanning angle (θ) changes so as to obtain a characteristic curve of the grating with the predetermined LWR, as shown in FIG. 7(a). Then, a comparing process is performed to select a matching simulated diffraction spectrum matched with the characteristic curve from a diffraction spectrum database including a plurality of simulated diffraction spectrums.

The present invention uses rigorous coupled wave theory to establish a simulated diffraction spectrum database with ideal grating structure (i.e., the roughness of the line width is zero) according to the predetermined grating structural parameters such as the overlay error, line width, pitch, thickness, and line-to-space (LS) ratio. A description of the technique of using rigorous coupled wave theory to establish a simulated diffraction spectrum database may be found by referencing ROC Patent Application No. 093136840 filed by the applicant of the present invention on Nov. 30, 2004. In the comparing process, a root mean square (RMS) error equation is selectively used to calculate deviations between the simulated diffraction spectrums and the characteristic curve, and selects the simulated diffraction spectrum with the minimum RMS error (i.e., the minimum deviation) as the matching simulated diffraction spectrum. The RMS error equation is defined as follows:

$$RMSE = \sqrt{\frac{\sum_{i=1}^{N}(x_i - y_i)^2}{N}},$$

wherein x and y represent the diffraction intensity of the simulated diffraction spectrum and that of the characteristic curve, and N represents the sampling number. As the matching simulated diffraction spectrum is selected from the diffraction spectrum database, a virtual line width of the characteristic curve ($CD_{i=1,j=1,k=1}$, wherein the LWR is not zero) is set by using the line width (with LWR of zero) of the matching simulated diffraction spectrum.

Figure 7B:
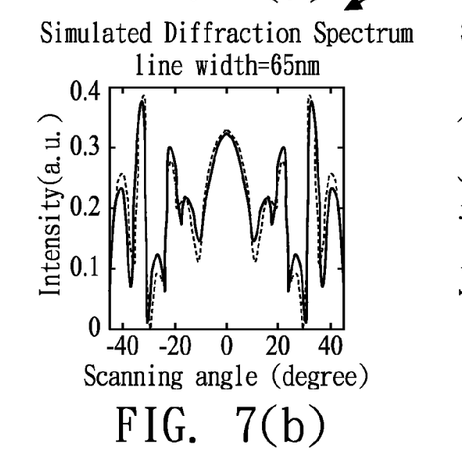
Figure 7C:
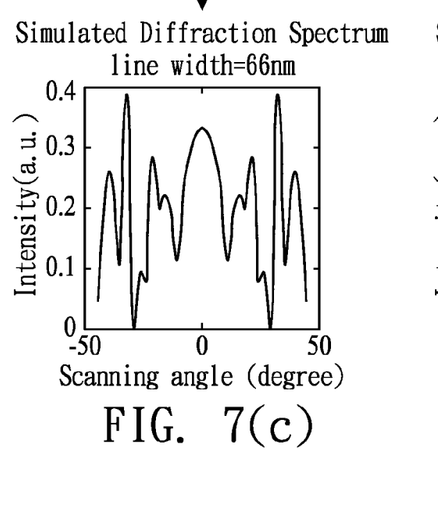
Figure 7D:
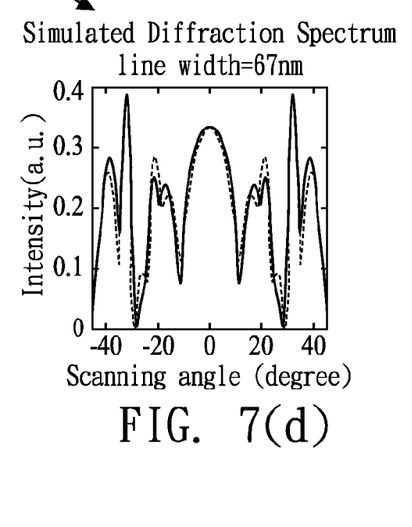

FIGS. 7(b), 7(c), and 7(d) show three simulated diffraction spectrums of the diffraction spectrum database, with line widths of 65 nm, 66 nm and 67 nm. The matching simulated diffraction spectrum is the one shown in FIG. 7(c). In particular, the predetermined line width of the characteristic curve is 65 nm, but the simulated diffraction spectrum with the line width of 66 nm is the matching one according to the compared result of the comparing process; this is because the LWR of the linear pattern influences the line width. Furthermore, the comparison results of the characteristic curves of different LWRs are different; that is, the characteristic curves have different virtual line widths. After the comparing process has been performed, parameters k (changing the measuring angle φ), j (changing $LWR_{PITCH}$), and i (changing $LWR_{AMP}$) are sequentially changed so as to obtain virtual line widths ($CD_{i,j,k}$) under different LWRs.

Figure 8:
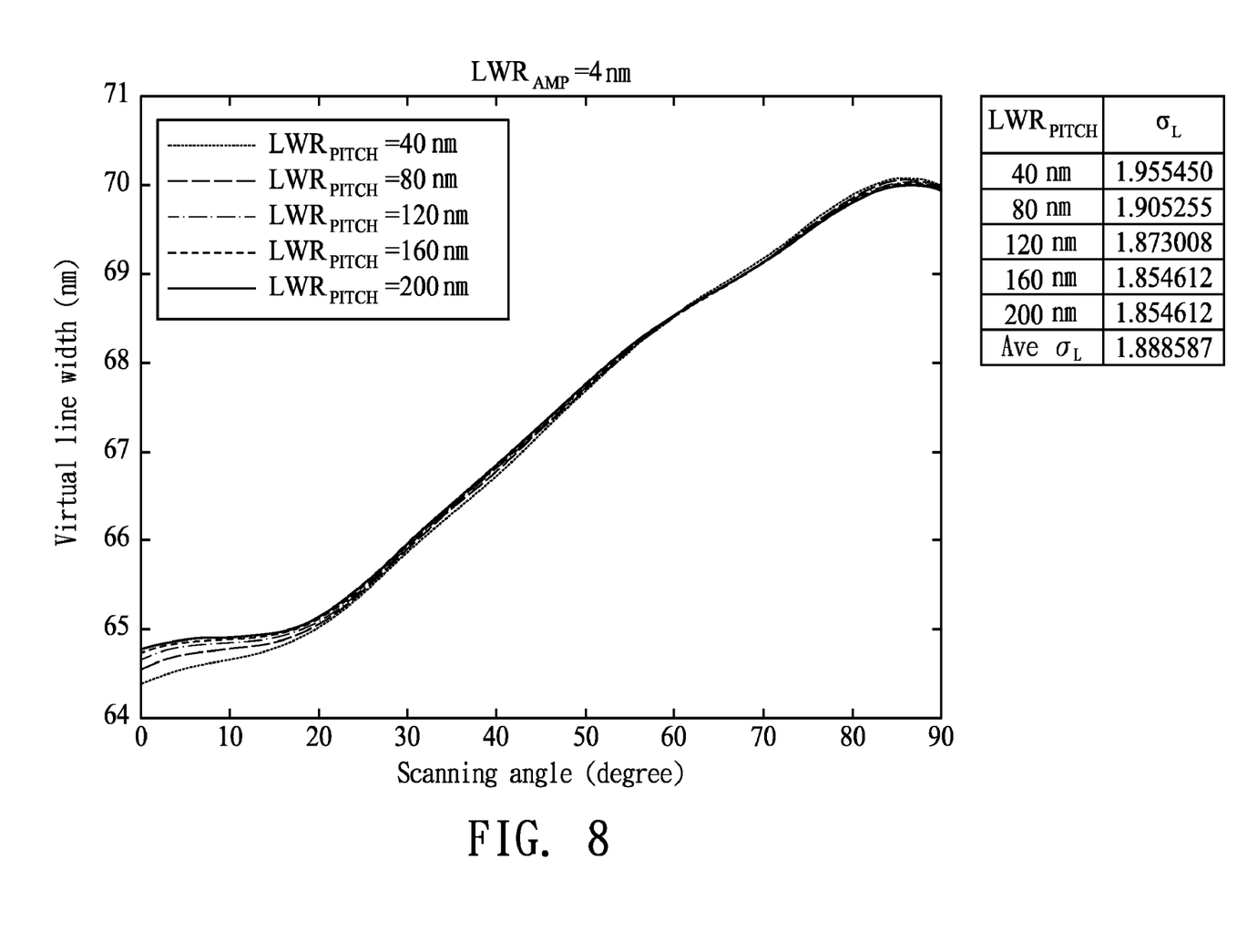
Figure 9:
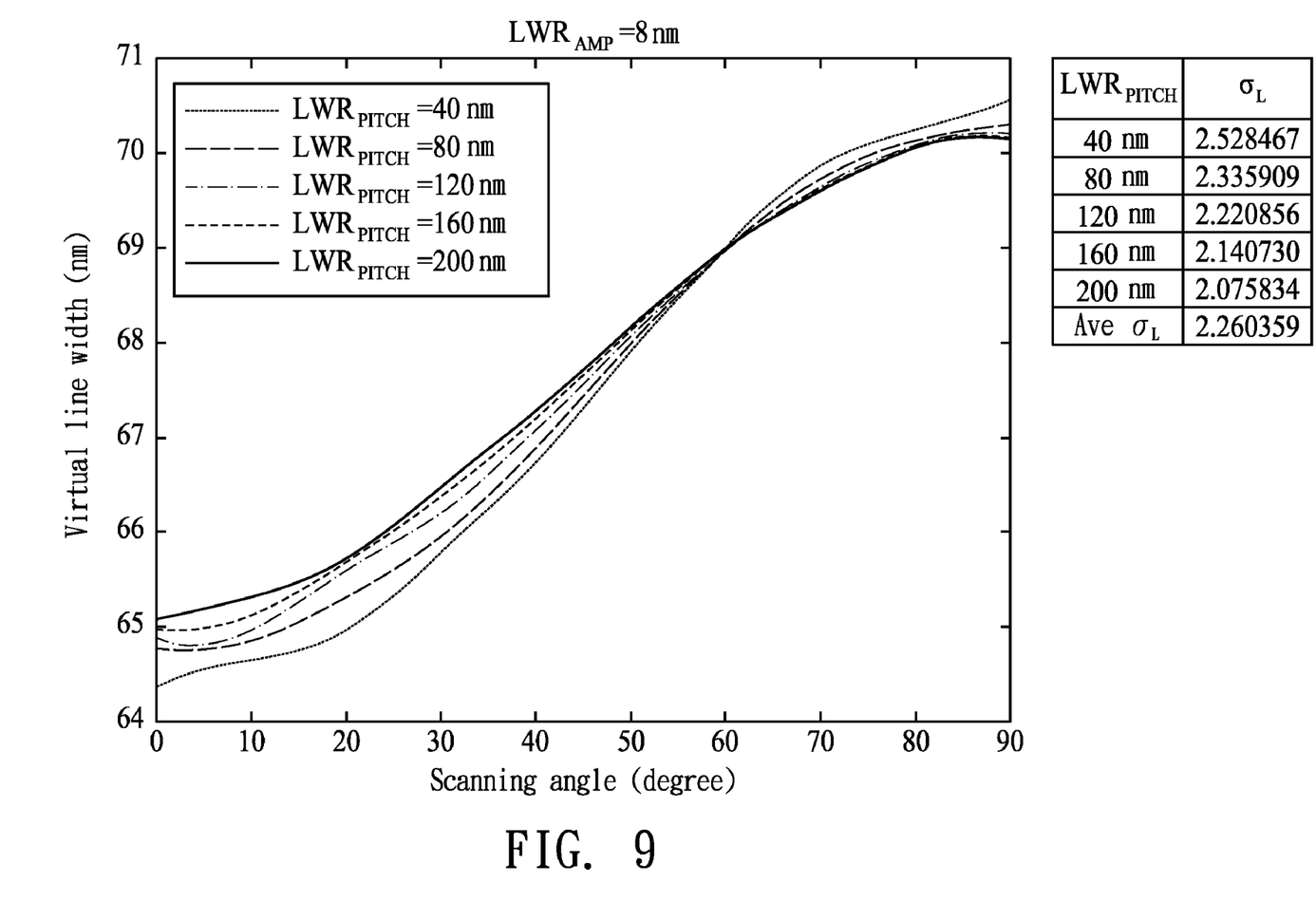
Figure 10:
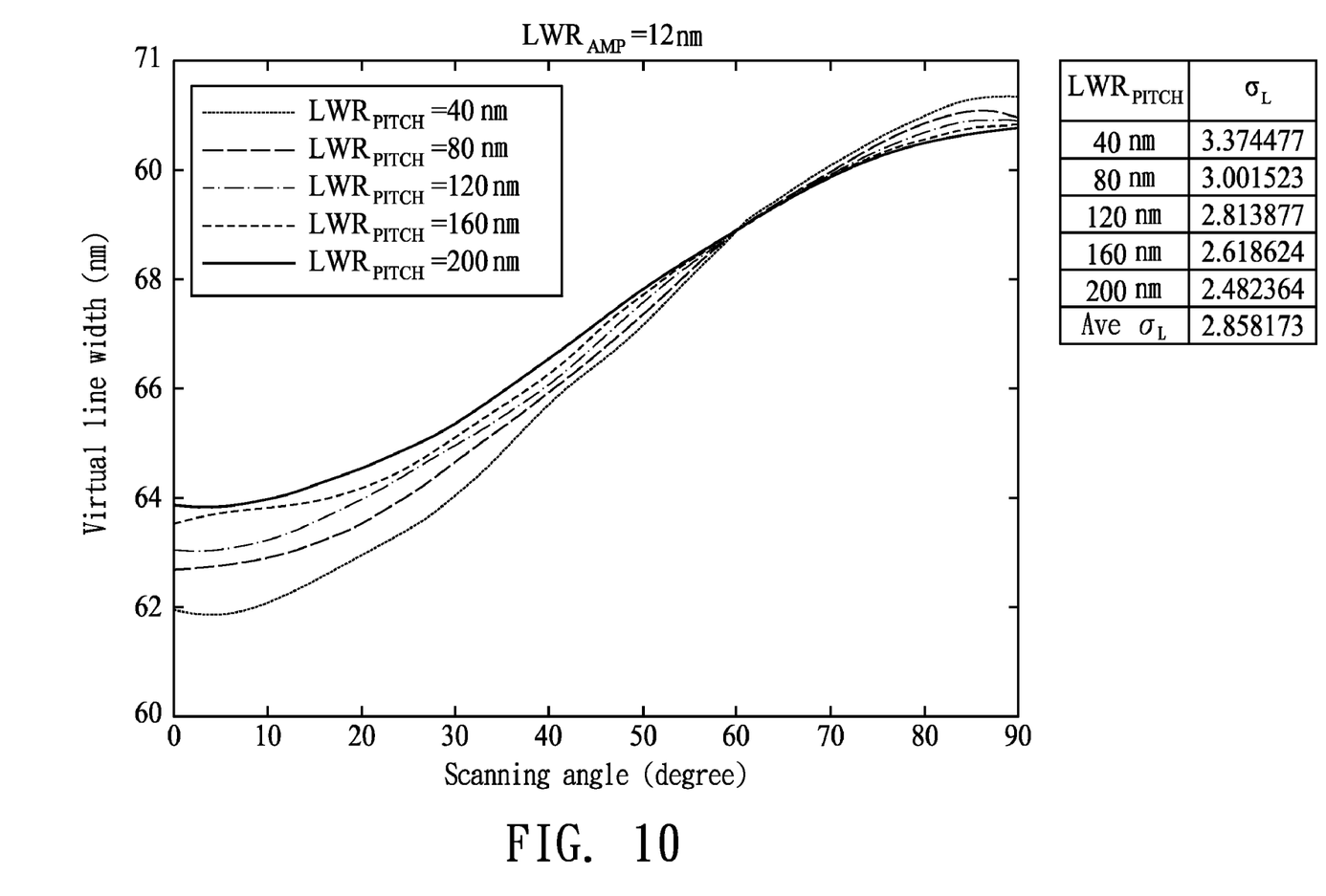
Figure 11:
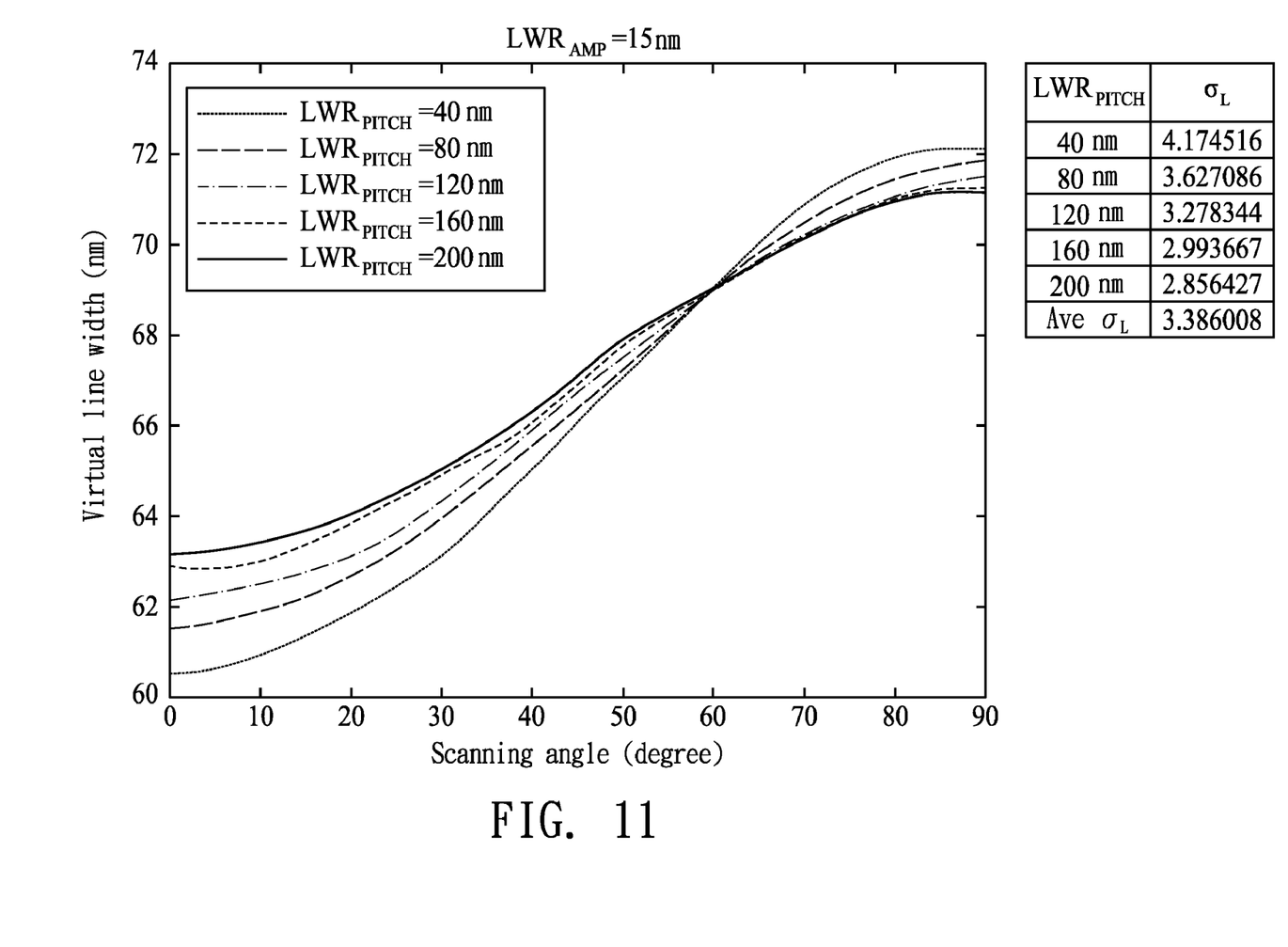

FIG. 8 shows a virtual line width curve with $LWR_{AMP}$ of 4 nm and $LWR_{PITCH}$ between 40 and 200 nm; the horizontal axis is the measuring angle (φ) of the laser beam 22, and the vertical axis is the virtual line width ($CD_{i,j,k}$) of the characteristic curve. According to the following equation, the curve standard deviation ($\sigma_L$) of each virtual line width curve is calculated, $$\sigma_L = \sqrt{\frac{\sum_{i=1}^{m}|f(\phi_i) - \bar{I}|^2}{m-1}}$$

wherein m represents the sampling number of the virtual line width curve, $f(\phi_i)$ represents the virtual line width of the virtual line width curve at the measuring angle $\phi_i$, and $\bar{I}$ represents the average LWR value of the virtual line width curve. When $LWR_{PITCH}$ changes from 40 nm to 200 nm, the variation of the virtual line width curve is not significant and the variation of the standard deviation is very small, and the average standard deviation (Ave$_{\sigma_L}$) of five virtual line width curves is 1.888587. The result shows that the pitch of the LWR does not significantly influence the virtual line width, and the virtual line width depends mainly on the amplitude of the LWR.

FIGS. 8 to 11 show virtual line width curves with different $LWR_{AMP}$ and $LWR_{PITCH}$ values; $LWR_{AMP}$ values are 4, 8, 12, and 15 nm, and $LWR_{PITCH}$ values are between 40 to 200 nm. The above equation is used to calculate the curve standard deviation ($\sigma_L$) of the virtual line width curve, and then the average curve standard deviation (Ave $\sigma_L$) of the $LWR_{AMP}$ of 4, 8, 12, and 15 nm is obtained through an averaging process.

Figure 12:
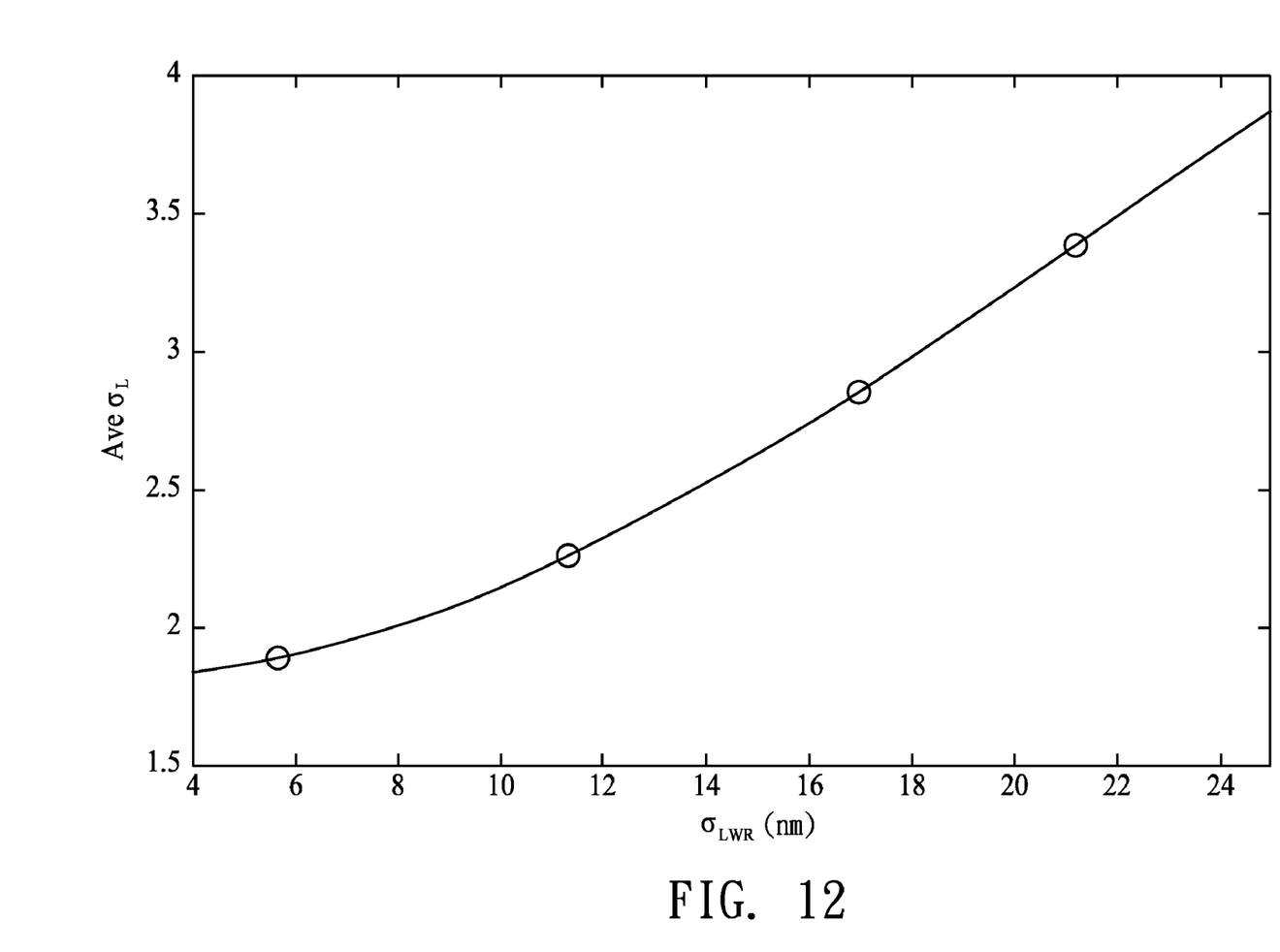

FIG. 12 shows the relationship between the LWR standard deviation ($\sigma_{LWR}$) and the average curve standard deviation (Ave $\sigma_L$). The LWR standard deviation ($\sigma_{LWR}$) is defined as $\sigma_{LWR}=\sqrt{2}\times LWR_{AMP}$. After the average curve standard deviations (Ave $\sigma_L$) of the $LWR_{AMP}$ of 4, 8, 12, and 15 nm are obtained, the LWR ($LWR_{AMP}$) and the average curve standard deviation (Ave $\sigma_L$) of the virtual line width curve are correlated to generate a correlating curve. In this manner, the average curve standard deviation (Ave $\sigma_L$) of gratings under test is measured, and then the LWR standard deviation ($\sigma_{LWR}$) of the grating under test may be estimated according to the correlating curve of FIG. 12. Subsequently, the LWR of the grating under test is calculated, which is described below in great detail, according to the equation $\sigma_{LWR}=\sqrt{2}\times LWR_{AMP}$.

Figure 13:
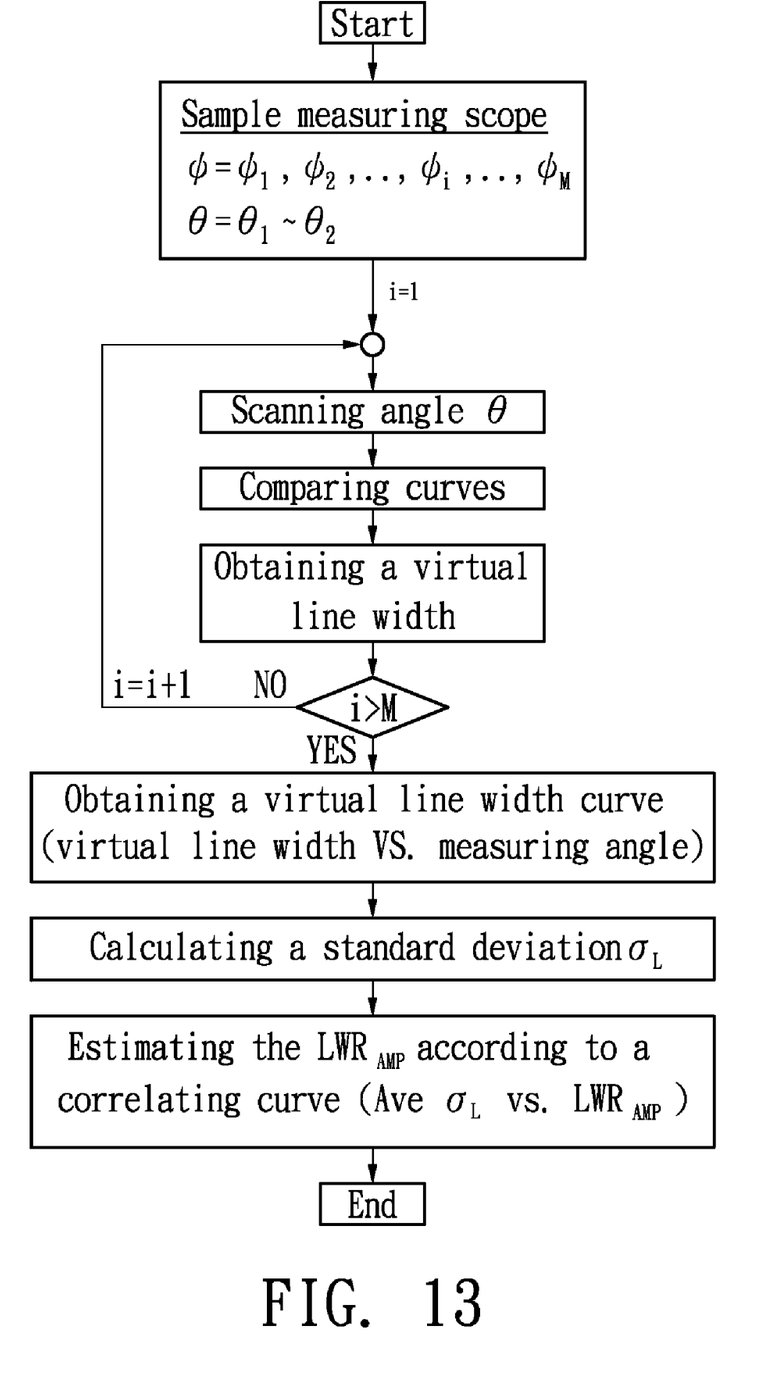
FIG. 13 shows a method for measuring the LWR of the present invention.

FIG. 13 shows the method for measuring the LWR according to the present invention. Firstly, the ranges of the scanning angle (θ) and the measuring angle (φ) of the angular scatterometer are set, a measuring angle (φ) is selected, and the laser beam 22 irradiates under different scanning angles (θ) on the grating under test. Next, as mentioned above, the curve comparing process is performed to select a matching curve (having a known line width) from the simulated diffraction spectrum database, and the line width of the matching curve is set as a virtual line width of the measuring curve. Subsequently, the measuring angle (φ) is changed and the above steps are repeated to obtain the matching curves of all the measuring angles (φ) and the corresponding virtual line width so as to generate a virtual line width curve of the virtual line width vs. the measuring angle (φ), and then the standard deviation ($\sigma_L$) of the virtual line width curve is calculated. The calculated standard deviation ($\sigma_L$) is taken as the average curve standard deviation (Ave $\sigma_L$) and substitutes into the correlating curve of FIG. 12, so as to estimate the LWR standard deviation ($\sigma_{LWR}$), and then the $LWR_{AMP}$ is calculated according to the equation $\sigma_{LWR} = \sqrt{2} \times LWR_{AMP}$.

The conventional AFM applied to the grating LWR measurement has the disadvantage of very low scanning speed, while the SEM causes shrinkage of the photoresist pattern resulting in the line width shrinkage effect and thereby influencing the CD measurement. In contrast, the method for correlating the LWR of the grating and the method for measurement thereof according to the present invention can use the optical angular scatterometer to perform LWR measurement, which can perform mass LWR measurement very quickly and solve the problem of very low scanning speed of the conventional AFM.

The above-described embodiments of the present invention are intended to be illustrative only. Numerous alternative embodiments may be devised by those skilled in the art without departing from the scope of the following claims.

What is claimed is:

1. A method for correlating a line width roughness of gratings, comprising the steps of:
   (a) generating a characteristic curve of a predetermined grating having a predetermined line width roughness;
   (b) performing a comparing process to select a matching simulated diffraction spectrum matched with the characteristic curve from a plurality of simulated diffraction spectrums with known line width, and setting a virtual line width of the characteristic curve by using the line width of the matching simulated diffraction spectrum;
   (c) changing a measuring angle and repeating steps (a) and (b) to generate a virtual line width curve, and calculating a deviation of the virtual line width curve;
   (d) changing the line width roughness of the predetermined grating and repeating steps (a), (b), and (c) to obtain a predetermined number of deviations of the virtual line width curves; and
   (e) correlating the line width roughness with the deviation of the virtual line width curve.

2. The method for correlating a line width roughness of gratings as claimed in claim 1, wherein the deviation of the virtual line width curve is a curve standard deviation.

3. The method for correlating a line width roughness of gratings as claimed in claim 2, wherein the curve standard deviation ($\sigma_L$) is calculated according to the following equation:

$$\sigma_L = \sqrt{\frac{\sum_{i=1}^{m} |f(\phi_i) - \bar{I}|^2}{m-1}},$$

wherein m represents a sampling number of the virtual line width curve, $f(\phi_i)$ represents the virtual line width value of the virtual line width curve at a measuring angle of $\phi_i$, and $\bar{I}$ represents an average virtual line width value of the virtual line width curve.

4. The method for correlating a line width roughness of gratings as claimed in claim 1, wherein the step of (d) changing the line width roughness of the predetermined grating comprises changing the amplitude of a sinusoidal curve.

5. The method for correlating a line width roughness of gratings as claimed in claim 1, wherein the step of changing the line width roughness of the predetermined grating comprises changing the period of a sinusoidal curve.

6. The method for correlating a line width roughness of gratings as claimed in claim 1, wherein the characteristic curve is a relationship curve of a diffraction intensity and a scanning angle.

7. The method for correlating a line width roughness of gratings as claimed in claim 6, wherein the scanning angle is an included angle between a laser beam and a normal line.

8. The method for correlating a line width roughness of gratings as claimed in claim 1, wherein the measuring angle is an included angle between a laser beam and the predetermined grating.

9. The method for correlating a line width roughness of gratings as claimed in claim 1, wherein the step of (a) generating a characteristic curve of a predetermined grating having a predetermined line width roughness uses a three-dimensional rigorous coupled wave theory to simulate the variation of the diffraction intensity as the scanning angle changes.

10. The method for correlating a line width roughness of gratings as claimed in claim 1, wherein the comparing process uses a root mean square error equation to calculate the deviations between the simulated diffraction spectrums and the characteristic curve, and the simulated diffraction spectrum with the minimum root mean square error is selected as the matching simulated diffraction spectrum.

11. A method for measuring a line width roughness of gratings, comprising the steps of
   (a) acquiring a characteristic curve of gratings under test;
   (b) performing a comparing process to select a matching simulated diffraction spectrum matched with the characteristic curve from a plurality of simulated diffraction spectrums with known line width, and setting a virtual line width of the characteristic value using the line width of the matching simulated diffraction spectrum;
   (c) changing a measuring angle and repeating steps (a) and (b) to generate a virtual line width curve, and calculating a deviation of the virtual line width curve;
   (d) calculating the line width roughness of the grating under test based on the deviation of the virtual line width curve; and
   (e) correlating the line width roughness of a plurality of predetermined gratings with the deviation of the virtual line width curve thereof to generate a correlating curve, and the deviation of the virtual line width curve of the grating under test is substituted into the correlating curve to calculate the line width roughness of the grating under test in step (d).

12. The method for measuring a line width roughness of gratings as claimed in claim 11, wherein the deviation of the virtual line width curve is a curve standard deviation.

13. The method for measuring a line width roughness of gratings as claimed in claim 12, wherein the curve standard deviation ($\sigma_L$) is calculated according to the following equation:

$$\sigma_L = \sqrt{\frac{\sum_{i=1}^{m}|f(\phi_i) - \bar{I}|^2}{m-1}},$$

wherein m represents a sampling number of the virtual line width curve, $f(\phi_i)$ represents the virtual line width value of the virtual line width curve at a measuring angle of $\phi_i$, and $\bar{I}$ represents an average virtual line width value of the virtual line width curve.

14. The method for measuring a line width roughness of gratings as claimed in claim 11, wherein the characteristic curve is a relationship curve of a diffraction intensity and a scanning angle.

15. The method for measuring a line width roughness of gratings as claimed in claim 14, wherein the scanning angle is an included angle between a laser beam and a normal line.

16. The method for measuring a line width roughness of gratings as claimed in claim 11, wherein the measuring angle is an included angle between a laser beam and the predetermined grating.

17. The method for measuring a line width roughness of gratings as claimed in claim 11, wherein in the comparing process uses a root mean square error equation to calculate the deviations between the simulated diffraction spectrums and the characteristic curve, and the simulated diffraction spectrum with the minimum root mean square error is selected as the matching simulated diffraction spectrum.

* * * * *